(No Model.)

J. M. KING.
SEED DRILL.

No. 448,349. Patented Mar. 17, 1891.

Witnesses
H. G. Dieterich
Wm. Bagger

Inventor
James M. King
By his Attorneys,
C. A. Snow & Co.

# UNITED STATES PATENT OFFICE.

JAMES M. KING, OF HEBRON, NEBRASKA.

SEED-DRILL.

SPECIFICATION forming part of Letters Patent No. 448,349, dated March 17, 1891.

Application filed October 28, 1890. Serial No. 369,595. (No model.)

*To all whom it may concern:*

Be it known that I, JAMES M. KING, a citizen of the United States, residing at Hebron, in the county of Thayer and State of Nebraska, have invented a new and useful Seed-Drill, of which the following is a specification.

This invention relates to seed-drills; and it has for its object to provide a device which shall be in the nature of a furrow-opener and which shall take the place of the runner usually employed in seed-drills as well as in corn-planters for the purpose of opening the furrow in the soil for the reception of the seed.

My improved furrow-opening device is composed of a pair of rotary disks mounted upon separate axes and adapted to run in contact with each other, so as to form a smooth and even furrow and permit the soil which is pulverized by the action of the said disks to drop back into the furrow and cover the seed as the machine progresses over the ground.

The invention consists in the details of construction, which will be hereinafter fully described, and particularly pointed out in the claims.

Figure 1:
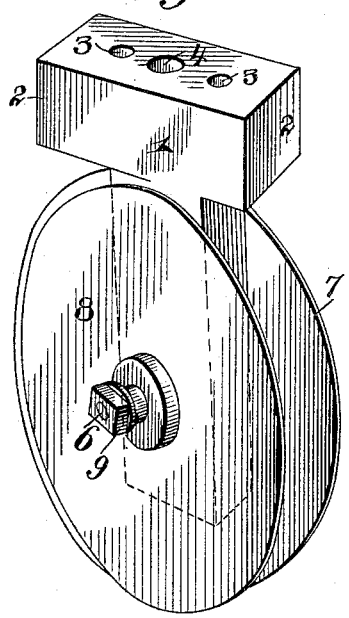
Figure 2:
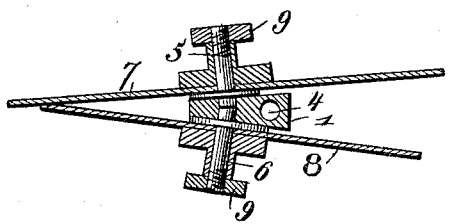
Figure 3:
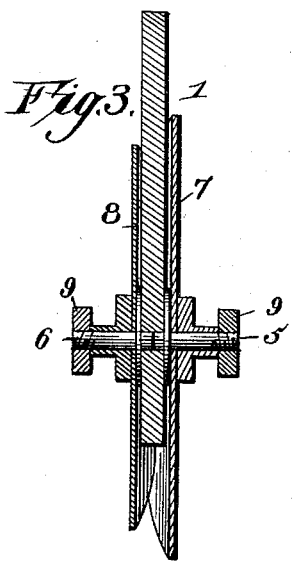
Figure 4:
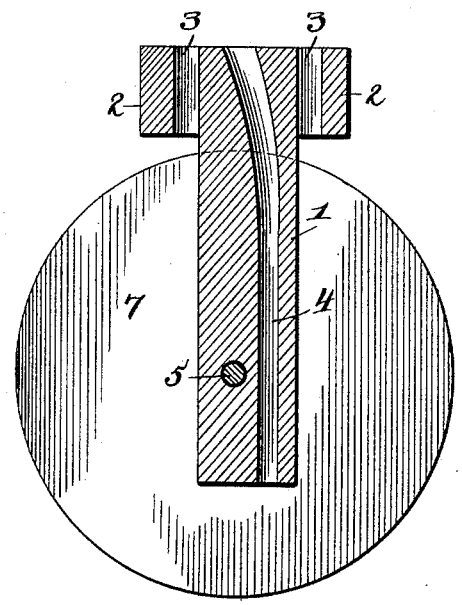

In the drawings hereto annexed, Figure 1 is a perspective view of my improved furrow-opening attachment for seed-planters. Fig. 2 is a horizontal sectional view taken through the axes of the revolving disks. Fig. 3 is a vertical transverse sectional view. Fig. 4 is a vertical longitudinal sectional view.

Like numerals of reference indicate like parts in all the figures of the drawings.

The seed-tube, which is designated by 1, is provided at its upper end with forwardly and rearwardly extending lugs 2 2, having perforations 3 to receive the bolts, by means of which they are to be fastened to the machine. The seed-tube is composed preferably of a solid casting, which is made tapering toward its front end, the thickened rear portion of said casting being provided with the vertical perforation or passage 4, which serves to convey the seed from the hopper to the ground. The seed-tube near its lower end is provided with laterally-extending stub-axles 5 and 6, which extend at right angles to the sides of the casting 1. It will thus be seen that the said stub-axles are placed at an angle to each other. Upon the said axles 5 and 6 are mounted the revolving disks or cutters 7 and 8, which are of unequal size, the former being somewhat larger in diameter. These disks or cutters are held upon the stub-axles by means of nuts 9, having suitable sleeves and washers, being interposed to permit the said disks to rotate freely. The front edge of the smaller disk 8 is so arranged as to bear against the adjacent side of the disk 7. The said smaller disk will thus be caused to rotate not only by frictional contact with the ground, but likewise by contact with the adjacent face of the disk 7.

The operation of this invention will be readily understood from the foregoing description, taken in connection with the drawings hereto annexed.

My improved attachment is applicable not only to seed-drills, but likewise to corn-planters and to all seed-planters in which shoes or runners have heretofore been used for the purpose of opening the furrows. The casting 1, which forms the seed-tube, is suitably bolted to the frame of the machine under the hopper or seed-box, and when the machine progresses over the ground the larger disk 7 will penetrate into the soil and form a furrow. The smaller disk will serve to force or sweep the superfluous soil to one side of the furrow, which is thus made ready to receive the seed which drops through the opening or passage 4. Both of the disks serve as shields to prevent the dropping of the seeds from being interfered with by wind, and it will be observed that the location of the seed-spout with relation to the furrow-openers is such that the seed is dropped into the furrow as soon as the latter has been opened, thus causing all the seeds to be deposited at an even depth. As the machine passes, the soil which has been pulverized by the action of the revolving disks will drop back into the furrow and cover the seeds.

The construction of the device is simple and inexpensive, and a seed-planter equipped with my improved furrow-opening device may be operated more easily and with less power than those provided with runners of ordinary construction.

Having thus described my invention, I claim—

1. A furrow-opening attachment for seed-planters, comprising a pair of revolving disks or cutters of unequal size mounted upon axles at an angle to each other, the forward edge of the smaller disk being arranged to bear against the adjacent face of the larger disk, substantially as set forth.

2. In a furrow-opening attachment for seed-planters, the combination of a seed-spout having forwardly-converging sides, the stub-axles extending laterally from the said sides at right angles to the latter, and the revolving disks or cutters of unequal size mounted upon the said stub-axles, substantially as and for the purpose set forth.

3. In a furrow-opening attachment for seed-planters, the combination of a seed-spout having forwardly-converging sides and of the stub-axles extending laterally from said sides at right angles to the latter, and revolving disks or cutters of unequal sizes mounted upon the said stub-axles, the front edge of the smaller disk being arranged to bear against the adjacent face of the larger disk, substantially as set forth.

4. In a furrow-opening attachment for seed-planters, the combination of a spout having forwardly-converging sides and provided at its upper end with forwardly and rearwardly extending lugs having vertical perforations, the stub-axles extending laterally from the converging sides of the spout at right angles to said sides, and the revolving disk or cutters of unequal sizes mounted upon the said stub-axles, substantially as and for the purpose set forth.

In testimony that I claim the foregoing as my own I have hereto affixed my signature in presence of two witnesses.

JAMES M. KING.

Witnesses:
J. D. BOYLE,
B. F. SHUFFLER.